(12) United States Patent
Lin et al.

(10) Patent No.: US 7,050,059 B2
(45) Date of Patent: May 23, 2006

(54) METHOD FOR A GRAPHICS CHIP TO ACCESS DATA STORED IN A SYSTEM MEMORY OF A COMPUTER DEVICE

(75) Inventors: Frank Lin, Taipei Hsien (TW); Victor Wu, Taipei Hsien (TW); Jacky Tsai, Taipei Hsien (TW); Hsiang-Yi Huang, Taipei Hsien (TW); Vincent Chang, Taipei Hsien (TW); Michael Liu, Taipei Hsien (TW); Heng-Chen Ho, Taipei Hsien (TW)

(73) Assignee: VIA Technologies Inc, Hsin-Tien (TW)

( * ) Notice: Subject to any disclaimer, the term of this patent is extended or adjusted under 35 U.S.C. 154(b) by 0 days.

(21) Appl. No.: 10/708,662

(22) Filed: Mar. 18, 2004

(65) Prior Publication Data

US 2004/0183804 A1 Sep. 23, 2004

(30) Foreign Application Priority Data

Mar. 21, 2003 (TW) .............................. 92106400 A

(51) Int. Cl.
*G09G 5/39* (2006.01)
*G06F 15/76* (2006.01)

(52) U.S. Cl. ...................................... 345/531; 345/519

(58) Field of Classification Search ................ 345/501, 345/522, 530–535, 541, 542, 519, 520; 711/100, 711/111, 147, 167, 151–154, 169, 158
See application file for complete search history.

(56) References Cited

U.S. PATENT DOCUMENTS

| | | | | |
|---|---|---|---|---|
| 6,035,322 A | * | 3/2000 | Demura et al. ............. | 709/201 |
| 6,052,134 A | * | 4/2000 | Foster ......................... | 345/533 |
| 6,564,304 B1 | * | 5/2003 | Van Hook et al. .......... | 711/154 |
| 6,898,679 B1 | * | 5/2005 | Sadowsky et al. .......... | 711/158 |
| 2003/0030644 A1 | * | 2/2003 | Wang et al. ................ | 345/532 |
| 2004/0139286 A1 | * | 7/2004 | Lin et al. .................... | 711/151 |

* cited by examiner

*Primary Examiner*—Kee M. Tung
(74) *Attorney, Agent, or Firm*—Winston Hsu

(57) ABSTRACT

A method for a graphics chip to access data stored in a system memory of a computer device is disclosed. The method includes using a memory controller to set a block capacity value; using the memory controller to divide a plurality of read requests corresponding to a predetermined request sequence into a plurality of request groups, wherein a total amount of data required by read requests grouped in each request group is less than the block capacity value; and using the memory controller to adjust a request sequence corresponding to read requests grouped in each request group for retrieving data stored at different N pages so that a memory device only performs N−1 page switching operations.

15 Claims, 4 Drawing Sheets

METHOD FOR A GRAPHICS CHIP TO ACCESS DATA STORED IN A SYSTEM MEMORY OF A COMPUTER DEVICE

BACKGROUND OF INVENTION

1. Field of the Invention

The present invention relates to a method for accessing the data stored in the memory, and more specifically, to a method for accessing the data stored in the system memory by a graphics chip.

2. Description of the Prior Art

With the development of multimedia technologies, displaying images has become an important application of computers. Graphics cards not only perform 2D image processing but also complex 3D image operations. Please refer to FIG. 1. FIG. 1 is a block diagram of a computer device 10 according to prior art. The computer device 10 comprises a central processing unit 12, a north bridge circuit 14, a south bridge circuit 16, a graphics chip 18, a graphics memory 20, a display device 22, a system memory 24, and an input device 26. The central processing unit 12 is used for controlling the computer device 10. The north bridge circuit 14 is used for arbitrating the signal transmission between the high-speed peripheral devices (e.g. graphics chip 18 and system memory 24) and the central processing unit 12. The south bridge circuit 16 is used for arbitrating the signal transmission of low-speed peripheral devices. (e.g. the entry device 26) and accesses the peripheral high-speed devices via the north bridge circuit 14. The graphics chip 18 is used for displaying data operations and storing the display data via the graphics memory 20. The graphics chip 18 outputs the display data to the display device 22 to output the image. Additionally, the system memory 24 is used for temporarily storing data and programs of the computer device 10. For example, the system memory is capable of loading an operating system, a resident program, and operational data and so on. Additionally, the accessing operation of the system memory 24 is controlled by the memory controller 15 in the north bridge circuit 14. Generally, the graphics chip 18 can use an accelerated graphics port (AGP) interface or a peripheral component interconnect (PCI) to read the operational data stored in the system memory 24. For example, in a 3D texturing operation, the accelerated graphics port can quickly read data in the system memory 24. With increasing applications using 3D image operations, the accelerated graphics port is becoming increasingly common in the graphics chip 18 to improve the efficiency of the 3D image operations.

Please refer to FIG. 2. FIG. 2 is a schematic diagram of data transmission between a conventional accelerated graphics port and a conventional peripheral component interconnect interface according the prior art. For the peripheral component interconnect interface, when the graphics chip 18 is connected to the peripheral component interconnect interface, the graphics chip 18 outputs a read request A1 to read the data D1 stored in the system memory 24 via the peripheral component interconnect interface. The graphics chip 18 occupies the bus of the peripheral component interconnect interface until the system memory 24 finishes fetching the data D1 and outputting the data D1 to the graphics chip 18 via the bus, at which time the graphics chip 18 releases the bus and another peripheral component (e.g. the input device 26) can use the bus of the peripheral component interconnect interface. This means that after fetching the data D1, another peripheral component outputs a read request A2 to read the data D2 stored in the system memory 24 via the peripheral component interconnect interface. As shown in FIG. 2, L1 is the time period that the graphics chip 18 outputs the read request A1 to the peripheral component interconnect interface to receive the data D1. In the period L1, the bus of the peripheral component interconnect interface is occupied by the graphics chip 18. Oppositely, the accelerated graphics port interface uses a pipeline to access data. The graphics chip 18 can use the bus of the accelerated graphics port interface to output a read request A1 reading the data in the system memory 24. However, before the system memory 24 finishes fetching the data, the graphics chip 18 can output the read request A2, A3, A4, A5 to read the data D2, D3, D4, D5 in the system memory 24. As shown in FIG. 2, when the graphics chip 18 outputs the read requests A1, A2, A3, A4, A5, the system memory 24 will execute the read requests A1, A2, A3, A4, A5 in the pipeline manner and the system memory will transmit the fetched data D1, D2, D3, D4, D5 to the graphics chip 18. So in the same period, when the graphics chip 18 uses the peripheral component interconnect interface according to the prior art to read the data in the system memory 25, the reading efficiency is not good due to the idle time (i.e. time L1) of the bus. However, the graphics chip 18 uses the accelerated graphics port interface according to the prior art to improve the efficiency of the data operation.

In general, the memory controller 15 is used for controlling the data entry operation and the data reading operation of the system memory 24. The memory controller uses a queue to store a plurality of read requests. This means that the data in the memory 24 is fetched according to the sequence of the read requests in the queue. Please refer to FIG. 3. FIG. 3 is a time sequence diagram for accessing data from a system memory 24 in FIG. 1. The graphics chip 18 continuously outputs the read requests RA1, RA2, RB1 to read the corresponding data D1, D2, D3 in the system memory 24. The data D1 and D2 are stored in the same row, namely in the same page A. The data D3 is stored in another row, namely in another page B. The queue of the memory controller 15 stores the read requests RA1, RA2, RB1 in order. So the executing sequence of read requests is read request RA1, read request RA2 and read request RB1. In the 1T period, the memory controller 15 executes a control request ActA to turn on the page A in the system memory 24, specifically to turn on all memory units corresponding to the page A to access the data stored in the memory units corresponding to the page A. In the 2T period, the memory controller 15 executes the read request RA1. When the data D1, D2 and D3 are 24 bytes and it takes 3T periods to read the 24 bytes from the system memory 24, the system memory 24 outputs the corresponding data D1 between times 4T and 7T. In the 5T period, while the memory controller 15 is executing the read request RA2, when the data D1 is output at time 7T, the system memory 24 fetches the data D2 from times 7T to 10T according to the burst mode because the page A is active. Because the data D3 is stored in the page B not in the page A, the page A should be pre-charged and the page B should be activated before the memory controller 15 executes the read request RB1 to read the data D3 on the page B, i.e. at time 8T. The memory controller 15 executes the control request PreA to pre-charge the page A, and then executes the control request ActB to activate the page B at time 9T. When the page B of the system memory 24 is activated to access the data, the memory controller 15 executes the read request RB1 at 10T and the system memory 24 starts to fetch the data D3 between times 12T and 15T.

From the above, the graphics chip 18 can use the pipeline to continuously output a plurality of read requests to the memory controller 15 to read the system memory 24. However, when the system memory 24 uses two read requests to read the data in different pages, the system memory 24 should pre-charge a page (e.g. PreA) and activate a page (e.g. ActA, ActB). The above-mentioned pre-charge and activate operations make the system memory 24 generate a period of delay time (i.e. the period L shown in FIG. 3) in the data accessing processing. In other words, when the system memory 24 uses a plurality of read requests to read a plurality of data on each page, the memory controller 15 should continuously control the system memory 24 to switch among pages. When the bus of accelerated graphics port interface according to the prior art transmits data to the graphics chip 18, the efficiency is not high enough because the bus must wait to receive the data from the system memory 24 according to the delay time of the system memory 25.

SUMMARY OF INVENTION

It is therefore a primary objective of the claimed invention to provide a method for accessing the data stored in the system memory with a graphics chip.

According to the claimed invention, a method for a graphics chip to access data stored in a system memory of a computer device comprises the following steps: (a) setting a block capacity value; (b) dividing a plurality of read requests corresponding to a predetermined request sequence and said block capacity value into a plurality of request, wherein a total amount of data required by read requests grouped in each request group is less than the block capacity value; (c) reordering the read requests in each of said request groups corresponding to data on the page of said system memory into a second request sequence for each of said request groups; and (d) executing the read requests in each of request group according to said second request sequence of each of said request groups.

According to the claimed invention, a method for accessing data that a plurality of read requests are used for accessing data from a system memory according to a pre-determined request sequence, the method comprises the following steps: (a) reordering said read requests according to pages in said system memory accessed by said read requests in a second request sequence, wherein said read requests accessed the same page of said system memory are continuously arranged; and (b) executing the read requests according to said second request sequence.

DETAILED DESCRIPTION

Figure 1:
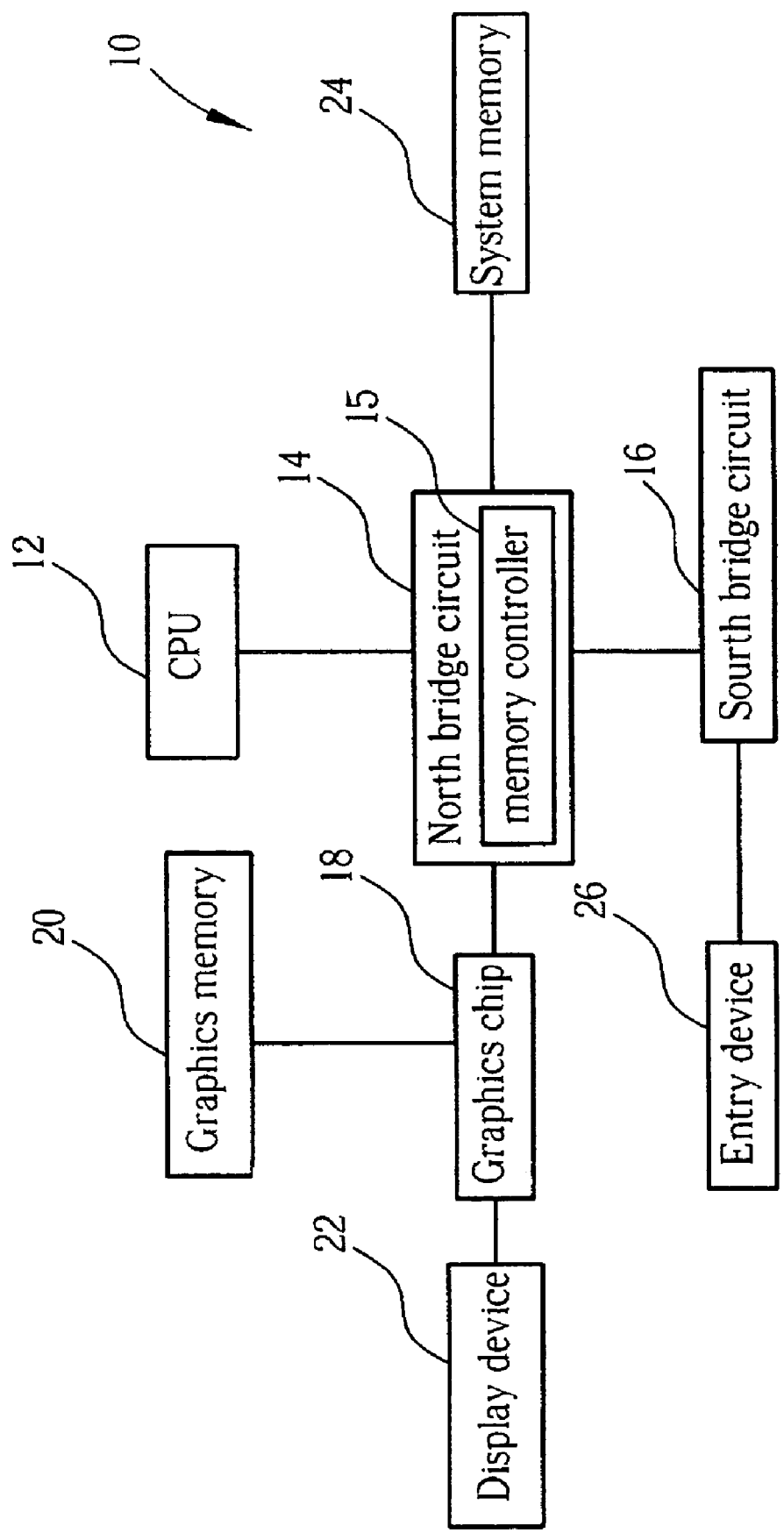
FIG. 1 is a block diagram of the computer device according to prior art.
Figure 2:
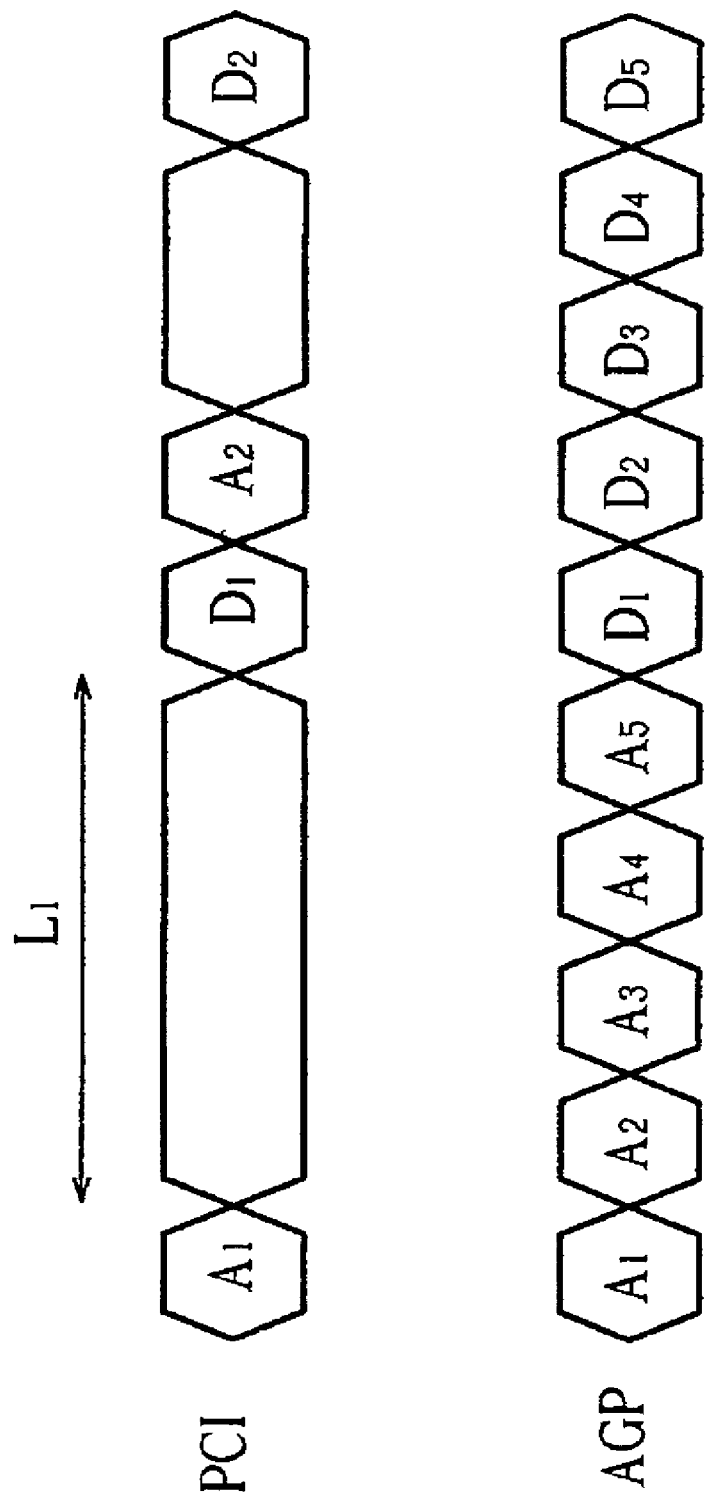
FIG. 2 is a schematic diagram of data transmission between a conventional accelerated graphics port and a conventional peripheral component interconnect interface of FIG. 1.
Figure 3:
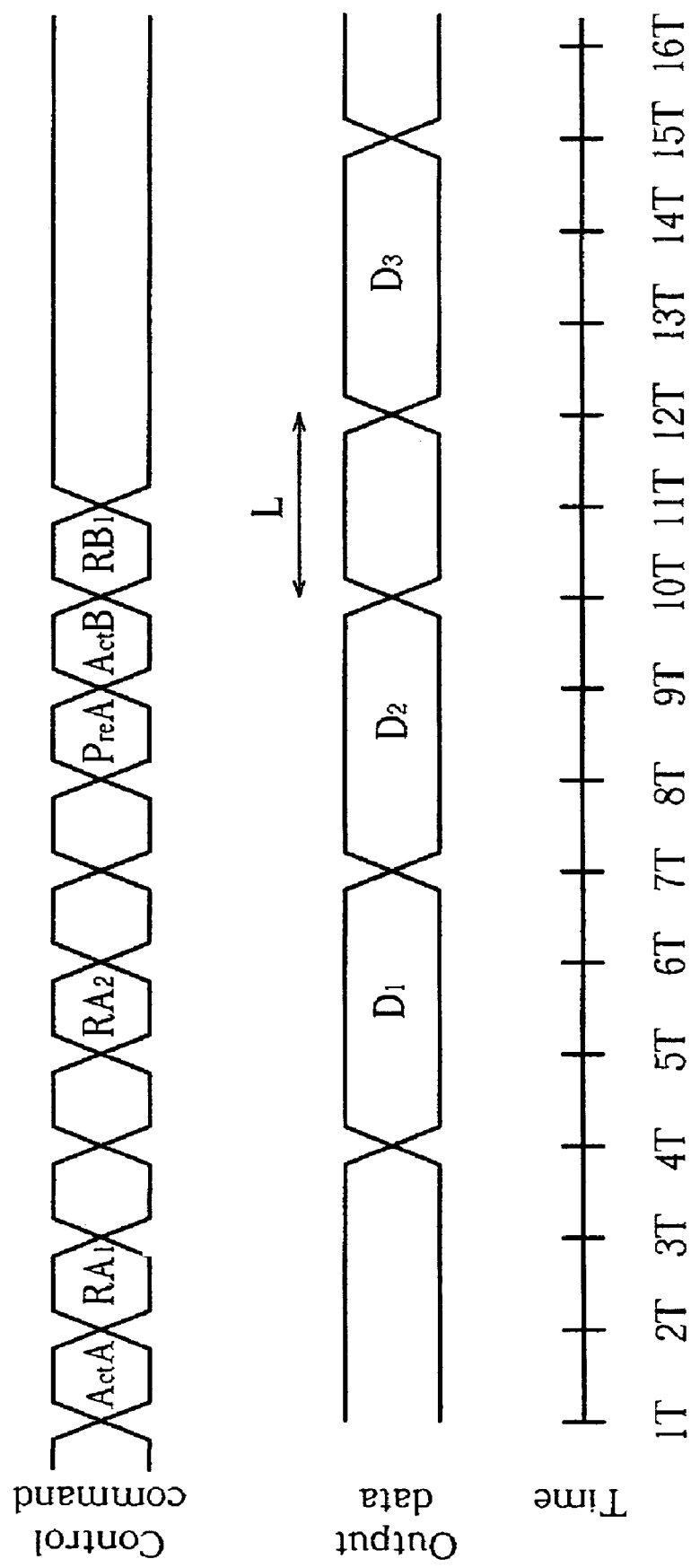
FIG. 3 is a time sequence diagram for accessing data from the system memory of FIG. 1.
Figure 4:
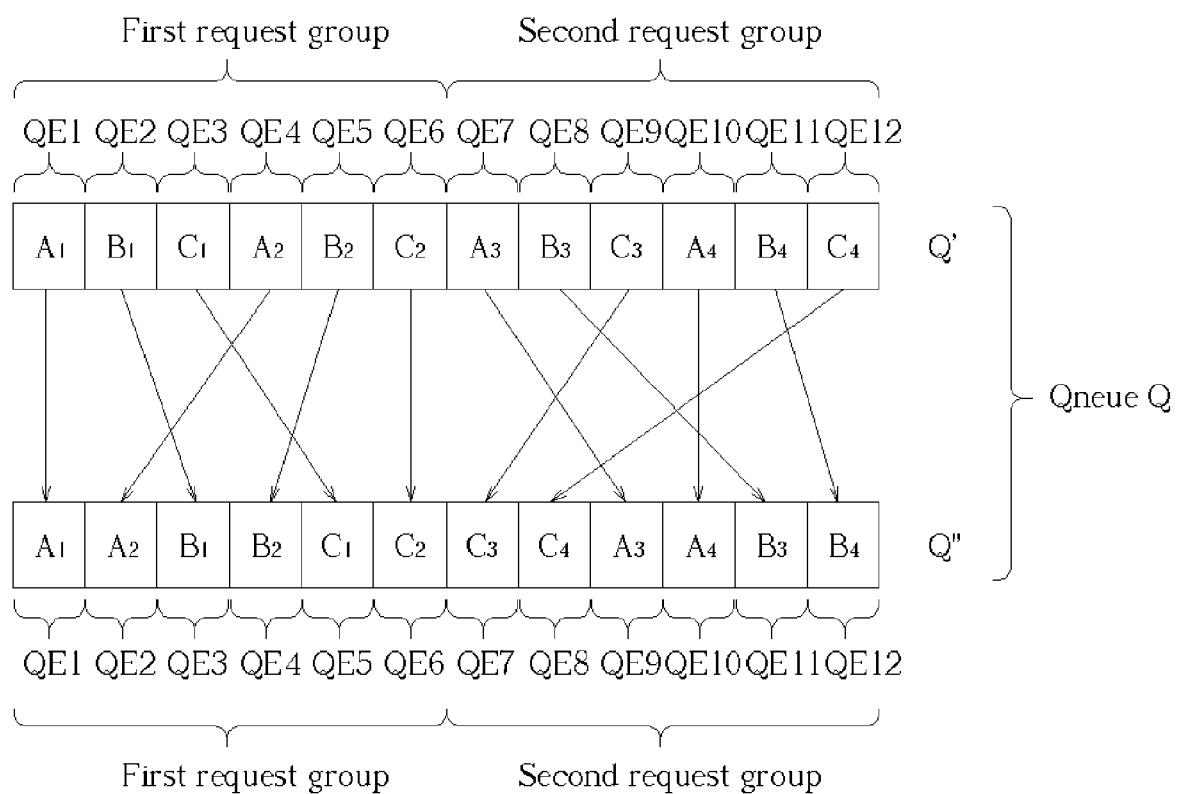
FIG. 4 is a schematic diagram for reordering reading requests according to the method for accessing data of the present invention.

Please refer to FIG. 1, FIG. 2, FIG. 3 and FIG. 4. FIG. 4 is a schematic diagram of reordering read requests according to the method for accessing data according to the invention. A queue Q is set in the memory controller 15 for temporarily storing the read requests output by the graphics chip 18. The memory controller 15 sequentially executes the read requests in the queue Q for reading the data in the system memory 24. As shown in FIG. 4, the graphics chip 18 outputs the read requests A1, B1, C1, A2, B2, C2, A3, B3, C3, A4, B4, C4 to read the data in the system memory 25. The read requests A1, B1, C1, A2, B2, C2, A3, B3, C3, A4, B4, C4 are sequentially recorded in queue entries QE1, QE2, QE3, QE4, QE5, QE6, QE7, QE8, QE9, QE10, QE11, QE12 of the queue Q. The read request recorded in the queue entry QE1 is the last executed read request. The read requests A1, A2 and A3 read the page A of the system memory 24. The read requests B1, B2 and B3 read the page B of the system memory 24. The read requests C1, C2 and C3 read the page C of the system memory 24. In this embodiment, there is a block capacity value set in the memory controller 15 for dividing the un-reordered queue Q. For example, the block capacity value is set as 32*64 bytes (i.e. 32 quadwords). The data quantity of the data read by the read requests A1, B1, C1, A2, B2, C2, A3, B3, C3, A4, B4, C4 can be added up from QE1. The queue entries QE1, QE2, QE3, QE4, QE5, QE6, QE7, QE8, QE9, QE10, QE11, QE12 and the corresponding read requests A1, B1, C1, A2, B2, C2, A3, B3, C3, A4, B4, C4 can be divided into the plurality of request groups according to the block capacity value. For example, the total amount of the data in the system memory 24 read by the read requests A1, B1, C1, A2, B2 and C2 is less than 32*64 bytes and the total amount of the data in system memory 24 read by the read requests A1, B1, C1, A2, B2, C2 and A3 is larger than 32*64 bytes. So the queue entries QE1, QE2, QE3, QE4, QE5 and QE6 and the corresponding read requests A1, B1, C1, A2, B2, C2 are indicated as a first request group, and the queue entries QE7, QE8, QE9, QE10, QE11 and QE12 and the corresponding read requests A3, B3, C3, A4, B4, C4 are indicated as a second request group.

At first, the read requests A1, B1, C1, A2, B2 and C2 in the first request group should be reordered. The queue entry QE1 is the beginning of the queue Q and the read request A1 will not be altered, i.e. in the queue Q the queue entry QE1 still stores the request A1, then searches whether any read request for reading the page A in the system 24 is in the first request group of the queue Q. In this embodiment, the read request A2 of the queue entry QE4 is for reading the page A of the system memory 24 after the execution order of the read request A2 is advanced, i.e. the queue entry QE2 of a queue Q' stores the read request A2. In the first request group of the queue, the read request B2 and C2 stored in the queue entries QE5 and QE6 behind the queue entry QE4 are not used for reading the page A of the system memory 24. So all read requests A1 and A2 in the first request group of the queue Q' for reading the page A of the system memory 24 are re-sorted. From the above, the read requests B1, C1, B2, C2 are not re-sorted. However the read request B1 is stored in the queue entry QE2 of the queue Q' and corresponded to the higher execution priority so that the executing turn of the read request B1 is changed and the read request B1 is next to the read request A2, i.e. in a queue Q", the queue entry QE3 is used for storing the read request B1 and the queue entry QE3 searches for a read request the same as the read request B1 that is used for reading the page A of the system memory 24. In the embodiment, the read request A2 stored in the queue entry QE5 of the queue Q' is also used for reading the page B of the system memory 24. So the execution order of the read request B2 is changed to be next to the read request B1, i.e. in the queue Q" the queue entry QE4 is used for storing the read request B2. Because the read request C2 stored in the queue entry QE6 in the first request group is not used for reading the page B of the system memory 24, all read requests B1 and B2 are re-sorted. Because the left read requests C1 and C2 are not re-sorted and the read request C1 is stored in the queue entry QE3 of the queue Q' and the read request C1 is corresponded to the higher executing priority, the execution order of the read request C1 is changed and the read request C1 is next to the read request B2, i.e. the queue entry QE5 is used for storing the read request C1 and the queue entry QE5 searches for the read request that is the same as the read request C1 for reading the page C of the system memory 24. In the embodiment, the read request C2 stored in the queue entry QE6 of the queue Q' is also used for reading the page C of the system memory 24 so that the execution turn of the read request C2 is changed and the read request C2 is behind and next to the read request C1, i.e. the queue entry QE6 stores the read request C2. At this moment, all read requests A1, B1, C1, A2, B2, C2 are re-sorted, i.e. the queue entries QE1, QE2, QE3, QE4, QE5 and QE6 store the read requests A1, A2, B1, B2, C1, C2 in the queue Q" corresponding to the queue Q' that is re-sorted.

According to the same operation principle, the read requests A3, B3, C3, A4, B4 and C4 of the second request group in the queue Q' are re-sorted. In the queue Q" the last queue entry QE6 stores the read request C3 for reading the page C of the system memory 24. When the read requests in the second request group of the queue Q' are re-sorted, whether a read request for reading the page C of the system memory 24 is in the second request group is determined. The read requests A2 and A3 stored in the queue entries QE7 and QE8 of the queue Q' are not used for reading the page C of the system memory 24. However, the read request C3 stored in the queue entry QE9 of the queue Q' is used for reading the page C of the system memory 24, so the execution order of the read request C3 is changed to behind and next to the read request C2, i.e. the queue entry QE7 of the queue Q' stores the read request C3 and whether the read request for reading the page C is in the second request group is determined. The read request C2 in the last queue entry QE6 of the first request group of the queue Q" and the read request C3 in the first queue entry QE7 of the second request group of the queue Q" are used for reading the page C, and the first request group of the queue Q" finishes data accessing. Therefore, the second request group of the queue Q" does not switch pages, improving the efficiency for data accessing.

In the embodiment, the read request C4 stored in the queue entry QE12 of the queue Q' is used for reading the page C of the system memory 24. Thus, the execution turn of the read request C4 is changed and the read request C4 is behind and next to the read request C3, i.e. the queue entry QE8 stores the read request C4. Because the read request C4 is stored in the last queue entry QE12 in the second request group of the queue Q', all read requests C3 and C4 in the second request group of the queue Q' for reading the page C of the system 24 are resorted. From the above, the read requests A3, B3, A4 and B4 are not re-sorted, but the read request A3 is stored in the queue entry QE7 so that the read request A3 has higher executing priority. Thus, the execution turn of the read request A3 is changed and the read request A3 is behind and next to the read request C4, i.e. the queue entry QE9 stores the read request A3. Then, whether any read request in the second request group is the same as the read request A3 that is used for reading the page A of the system memory 24 is determined.

In the embodiment, the read request A4 stored in the queue entry QE10 of the queue Q' is used for reading the page A of the system memory 24. The execution order of the read request A4 is changed and the read request A4 is behind and next to the read request A3, i.e. the queue entry QE10 stores the read request A4. Because the read request B4 stored in the queue entry QE11 behind the queue entry QE10 in the second request group of the queue Q' is not used for reading the page A of the system memory 24, all read requests A3 and A4 in the second request group of the queue Q' for reading the page A of the system 24 are re-sorted. Because the read requests B3 and B4 are not re-sorted and the read request B3 is stored in the queue entry QE8, the read request B3 has a higher execution priority. The execution of the read request B3 is changed and the read request B3 is behind and next to the read request A4, i.e. the queue entry QE11 stores the read request B3. Then, whether any read request in the second request group is the same as the read request B3 that is used for reading the page B of the system memory 24 is determined. In the embodiment, the read request B4 stored in the queue entry QE11 of the queue Q' is used for reading the page B of the system memory 24. Thus, the execution turn of the read request B4 is changed and the read request B4 is behind and next to the read request B3, i.e. the queue entry QE12 stores the read request B4. At this moment, all read requests A3, B3, C3, A4, B4 and C4 are re-sorted, i.e. the queue entries QE7, QE8, QE9, QE10, QE11 and QE12 store the read requests C3, C4, A3, A4, B3 and B4 in order in the resorted queue Q".

The graphics chip 18 reads the system memory 24 in order via the accelerated graphic port interface, i.e. the graphic chip 18 outputs the read requests A1, B1, C1, A2, B2, C2, A3, B3, C3, A4, B4 and C4 in order to read the data in the system memory 24. So the memory controller 15 should transmit the data corresponding to the read request A1, B1, C1, A2, B2, C2, A3, B3, C3, A4, B4 and C4 to the graphics chip 18 according the receiving order of the read requests A1, B1, C1, A2, B2, C2, A3, B3, C3, A4, B4 and C4. For example, when the read requests A1, B1, C1, A2, B2, C2, A3, B3, C3, A4, B4 and C4 respectively read the stored data DATA1, DATA2, DATA3, DATA4, DATA5, DATA6, DATA7, DATA8, DATA9, DATA10, DATA11 and DATA12. The order in which the read requests A1, B1, C1, A2, B2, C2, A3, B3, C3, A4, B4 and C4 are executed can be ignored. The memory controller 15 finally transmits the stored data DATA1–DATA12 to the graphics chip 18 according to the storing order of the stored data DATA1–DATA12. When the execution order of the read requests A1, B1, C1, A2, B2, C2, A3, B3, C3, A4, B4 and C4 are changed, the graphics chip 18 waits for the memory controller 15 to return the data. As shown in FIG. 4, in the un-sorted queue Q, the read request B1 is stored in the queue entry QE2. The memory controller executes the read requests A1, B1, C1, A2, B2, C2, A3, B3, C3, A4, B4 and C4 according to the queue Q'. When the read request A1 has been executed, the read request B1 will be executed. However, the read request B1 is stored in the queue entry QE3 in the resorted queue Q'. When the memory controller 15 executes the read requests A1, A2, B1, B2, C1, C2, C3, C4, A3, A4, B3 and B4 according to the queue Q', the read request B1 will be executed until the read requests A1 and A2 are executed, i.e. when the graphics chip 18 receives the data DATA1 from the memory controller, the graphics chip 18 should wait for the memory controller 15 to execute the read request A2 to read the stored data DATA4. The memory controller 15 will store the DATA4 in a buffer at first according to the prior art, i.e. the data DATA4 will not be transmitted to the graphics chip 18 immediately. The memory controller 15 executes the read request B1 and then transmits the corresponding stored data DATA2 to the graphics chip 18. For the read request C1, the read request C1 is stored in the queue entry QE5 of the queue Q', i.e. when the graphics chip 18 receives the stored data DATA2 from the memory controller 15, the graphics chip 18 should wait for the memory controller 15 to execute the read request B2 to read the stored data DATA5. The memory controller 15 stores the data DATA5 in the buffer at first, and the data DATA5 is not transmitted to the graphics chip 18 immediately. The memory controller 15 executes the read request C1 and transmits the corresponding stored data DATA3 to the graphics chip 18. Because the buffer stores the stored data DATA4 and DATA5, the memory controller 15 can read the buffer in order to transmit the stored data DATA4 and DATA5 to the graphics chip 18.

Then, the un-sorted queue Q' is compared with the re-sorted queue Q" as shown in FIG. 4. In the first request group, the read requests B1 and C1 are respectively stored in the queue entries QE2 and QE3 of the queue Q'. The read requests B1 and C1 are respectively stored in the QE3 and QE5 of the queue Q". Because the queue priority of the queue entry QE3 is lower than the queue priority of the queue entry QE2 and the queue priority of the queue entry QE5 is lower than the queue priority of the queue entry QE3, the graphics chip 18 must wait for the memory controller 15 to receive the stored data DATA2 and DATA3 when the memory controller 15 executes the resorted queue Q". For avoiding reduced efficiency from the graphics chip 18 waiting for data, the method for accessing data in the invention uses the block capacity to adjust the number of the resorted read requests, i.e. when the block capacity is 32*64 bytes, in the worst case example, the read request A3 is stored in the queue entry QE7 in the second request group of the queue Q' but is stored in the queue entry QE12 in the second request group of the resorted queue Q". When the operation time that the system memory 24 switches the pages is not under consideration, the method for accessing data in the invention can make the time that the graphics chip 18 waits for the data to be not larger than the time that the system memory 24 fetches 32*64 bytes of data. In other words, the method for accessing data in the invention can set adaptive block capacity to control the time that the graphics chip 18 waits for the data, i.e. the graphics chip 18 can be adjusted to have the best execution efficiency. Further, the block capacity can be adjusted dynamically according the activity level of the system memory 24. For example, when the memory is busy, the block capacity can be enlarged to reduce the number of closed pages. On the other hand, the block capacity can be reduced or kept at an original setting. Additionally, although the method for accessing data of the invention makes the graphics chip 18 idle when the graphics chip 18 waits for data, when the read requests in the queue are re-sorted, the operation time that the system memory 24 uses when switching pages can be reduced substantially. For example, when the memory controller 15 executes the read requests A1, B1, C1, A2, B2, C2, A3, B3, C3, A4, B4 and C4 to read the stored data DATA1–DATA12 of the system memory 24, the system memory 24 should switch pages 11 times. According to the prior art, the page switch includes turning off a page and turning on another page so that the efficiency at which the system memory 24 accesses data is reduced. In the embodiment, the read requests A1, B1, C1, A2, B2, C2, A3, B3, C3, A4, B4, C4 are divided into a first request group and a second request group and the read request are resorted in the request groups to generate a queue Q". When the memory controller 15 executes the read requests A1, A2, B1, B2, C1, C2, C3, C4, A3, A4, B3 and B4 according to the queue Q", the system memory 24 switches pages 4 times so that the efficiency at which the system memory 24 accesses the data can be improved substantially. In a word, although the method for accessing data makes the graphics chip 18 idle while waiting for the data, the method improves the efficiency at which the system memory 24 accesses the data. In other words, improvement of the efficiency that the system memory 24 accesses data can compensate the time that the graphics chip 18 waits for the data. In the embodiment, the sorting method is applied in a display control circuit to read the read requests output from a system memory. However, the method for accessing data can also be applied to other data processing devices (e.g. CPU) to read the data of the system memory to achieve the goal of improving the efficiency of data access.

The method for accessing data according to the invention uses a block capacity to divide a plurality of read requests into a plurality of request groups. The block capacity is used for limiting the worst-case time that a graphics chip waits for data. The reduction of efficiency occurring when a plurality of the read requests are re-sorted can be avoided. Additionally, the read requests of the request group are used for reading the N pages of a system memory. When the read requests in the request group of the invention are re-sorted, the system memory switches the pages (N–1) times. The method for accessing data in the invention can improve the execution efficiency at which the graphics chip reads the system memory and further improve the operating efficiency of the graphics chip.

Those skilled in the art will readily observe that numerous modifications and alterations of the device may be made while retaining the teachings of the invention. Accordingly, the above disclosure should be constructed as limited only by the metes and bounds of the appended claims.

The invention claimed is:

1. A method for a graphics chip to access data stored in a memory device of a computer device comprising:
    setting a block capacity value;
    dividing a plurality of read requests corresponding to a predetermined request sequence and said block capacity value into a plurality of request, wherein a total amount of data required by read requests grouped in each request group is less than the block capacity value; and
    reordering the read requests in each of said request groups corresponding to data on the page of said memory device into a second request sequence for each of said request groups;
    executing the read requests in each of request group according to said second request sequence of each of said request groups.

2. The method of claim 1 further comprising: when the pages accessed by the read requests in the next request group is as same as the page accessed by the final read request in the last request group,
    executing said read requests in the next request group at first, and then executing other read requests in the next request group.

3. The method of claim 1 wherein the computer device comprises a memory controller that stores the plurality of read requests in a queue.

4. The method of claim 1 wherein the computer device comprises a memory controller installed in a north bridge circuit and the north bridge circuit is used for controlling transmission between a graphics chip and the memory device.

5. The method of claim 1 wherein the computer device comprises a memory controller, and data that are read with the memory controller are transmitted to a graphics chip.

6. The method of claim 5 wherein the graphics chip is connected electrically to the memory controller through an accelerated graphics port bus in the computer device.

7. The method of claim 1 wherein the memory device is a system memory of the computer system.

8. The method of claim 1 wherein the computer device comprises a memory controller that stores the data in the graphics chip according to the predetermined request sequence.

9. A method for accessing data, a plurality of read requests used for accessing data from a memory device according to a predetermined request sequence, the method comprising:
   establishing at least two request groups for the plurality of read requests;
   reordering said read requests according to pages in said memory device accessed by said read requests into a second request sequence, wherein within each request group, said read requests accessing the same page of said memory device are continuously arranged, and when a current request group has a read request of the same page as a last read request of a previous request group, a first read request of the current request group is ordered to correspond to the page of the last read request of the previous request group; and executing the read requests according to said second request sequence.

10. The method of claim 9 wherein the memory controller is used to store the plurality of read requests in a queue.

11. The method of claim 9 wherein the memory controller is installed in a north bridge circuit and the north bridge circuit is used for controlling the transmission between a graphics chip and the memory device.

12. The method of claim 9 wherein data are read with a memory controller and are transmitted to a graphics chip.

13. The method of claim 12 wherein the graphics chip is connected electrically to the memory controller through an accelerated graphics port bus in the computer device.

14. The method of claim 9 wherein the memory device is a system memory of the computer device.

15. The method of claim 9 wherein a memory controller stores the data in a graphics chip according to the predetermined request sequence.

* * * * *